Feb. 1, 1966     H. NÄDLER ET AL     3,232,817
MACHINE FOR MAKING CARCASSES FOR PNEUMATIC VEHICLE TIRES
Filed Nov. 26, 1962     3 Sheets-Sheet 1

INVENTORS:
Heinrich Nädler
Hans Menell
by

Feb. 1, 1966 — H. NÄDLER ET AL — 3,232,817
MACHINE FOR MAKING CARCASSES FOR PNEUMATIC VEHICLE TIRES
Filed Nov. 26, 1962
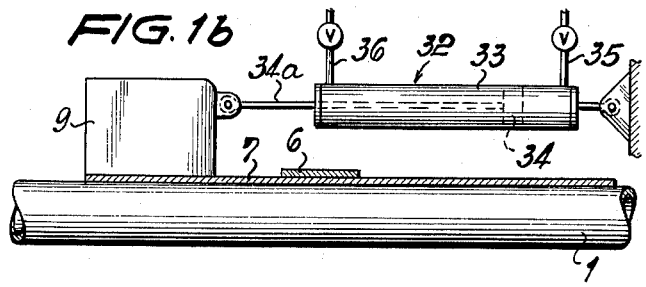
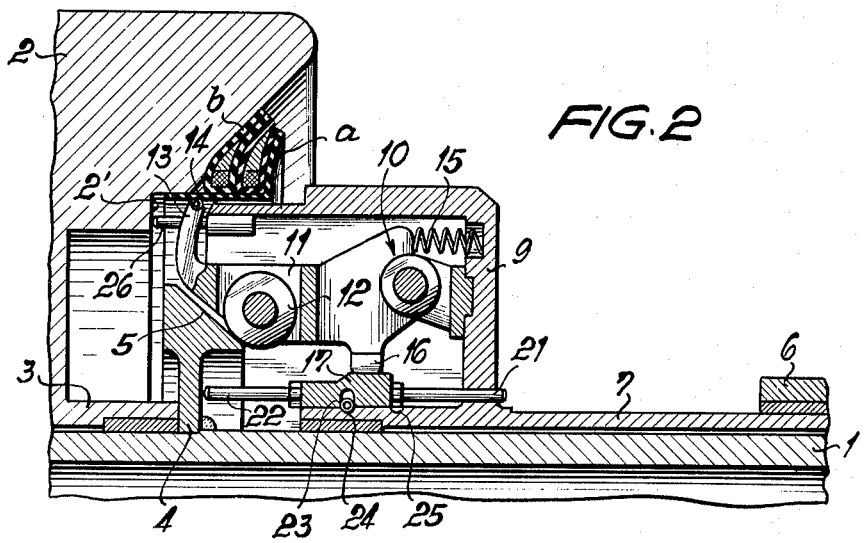
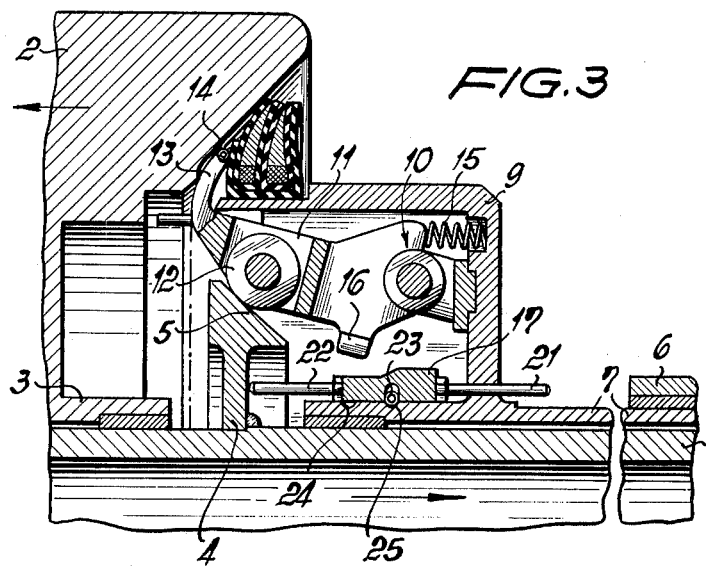
INVENTORS:
Heinrich Nädler
Hans Menell INVENTORS:
Heinrich Nädler
Hans Menell United States Patent Office 3,232,817
Patented Feb. 1, 1966

3,232,817
MACHINE FOR MAKING CARCASSES FOR
PNEUMATIC VEHICLE TIRES
Heinrich Nädler, Hagen, Kreis Neustadt am Rubenberge, and Hans Menell, Ahlem, Hannover, Germany, assignors to Continental Gummi-Werke Aktiengesellschaft, Hannover, Germany
Filed Nov. 26, 1962, Ser. No. 240,088
Claims priority, application Germany, Nov. 27, 1961, C 25,600
13 Claims. (Cl. 156—398)

The present invention relates to a machine for making carcasses for pneumatic vehicle tires and, more specifically, concerns a machine of this type which has a drum for receiving the carcass forming inserts and also comprises a ring which may consist of segments and which has an outer diameter substantially corresponding to the inner diameter of the tire to be built. This ring is adapted by a movement relative to the drum to grasp free marginal portions of the fabric inserts or the like for the raw tire and to set said marginal portions against the inner circumferential surface of tire beads.

With the heretofore known machine of the type set forth above, the ring for deforming the fabric inserts or the like is fixedly mounted on the machine shaft. The deformation and the setting operation of the fabric is in this instance effected by an axial displacement of the drum while the free marginal portions of the fabric layers slide over the ring. While in this way a crease-free engagement of the free marginal portions with the inner circumferential surface of the tire is possible, a relative movement can, however, be carried out in one direction only. In other words, after the deformation of the fabric layers has been carried out, the drum on the one hand and the ring on the other hand cannot be returned any longer to their original position.

It is, therefore, an object of the present invention to provide a machine for making carcasses for pneumatic vehicle tires which will overcome the above mentioned drawback.

It is another object of this invention to provide a machine as set forth in the preceding paragraph in which the drum may be fixedly mounted with regard to the drum shaft while the ring may selectively be moved in the direction toward and away from the drum.

It is still another object of this invention so to design a machine as set forth in the preceding paragraphs that the ring may be employed for lifting the bead portions of the built-up raw tire from the tire building drum.

These and other objects and advantages of the invention will appear more clearly from the following specification in connection with the accompanying drawings, in which.

FIG. 1b diagrammatically illustrates means for operating the carcass making machine according to the present invention.

Figure 1:
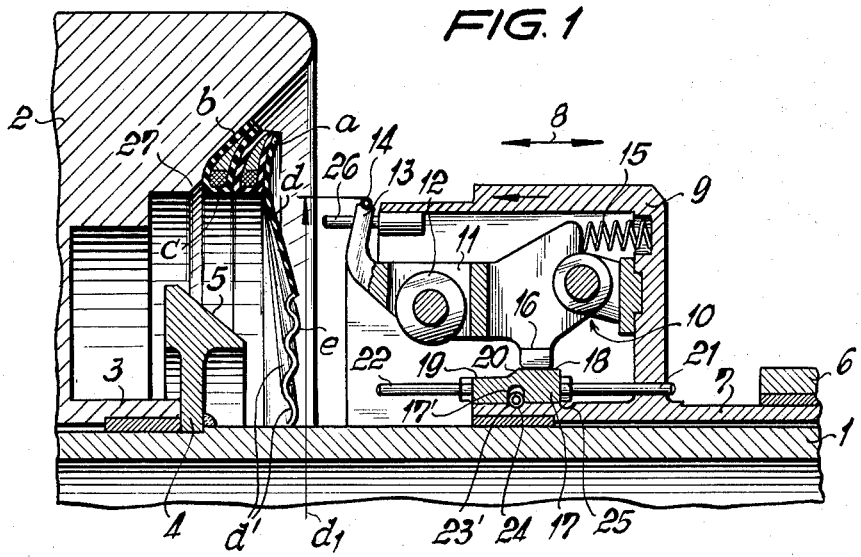
FIG. 1 is a partial section through a carcass making machine according to the present invention, including a tire building drum and a hollow shaft.
Figure 1A:
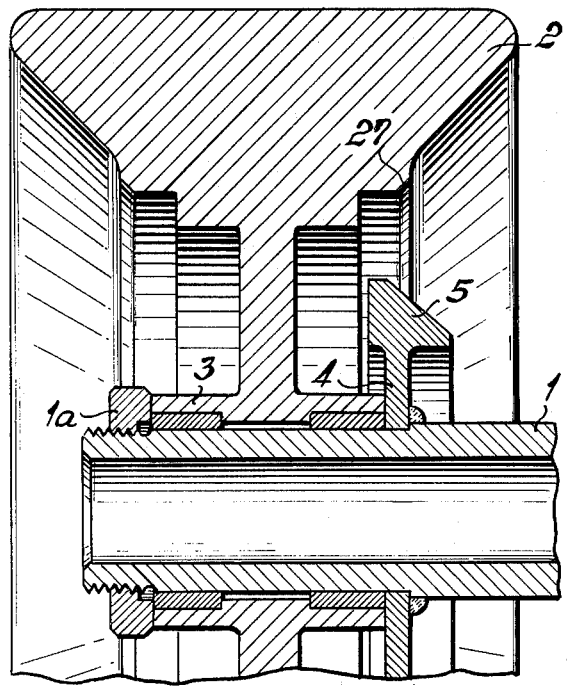
FIG. 1a illustrates the connection between the tire building drum and the hollow shaft of FIG. 1.
Figure 4:
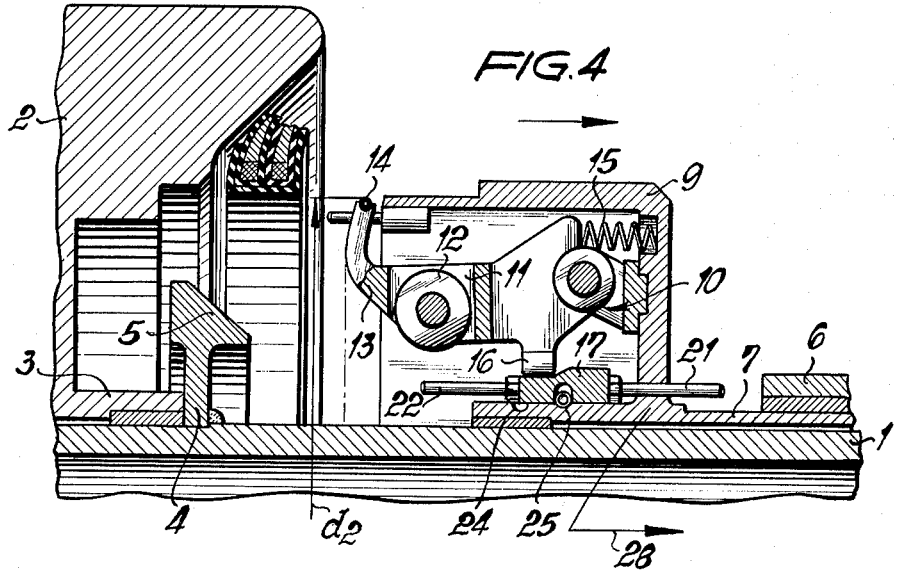

FIGS. 2 to 4 are partial sections similar to that of FIG. 1 but showing the machine of FIG. 1 during consecutive phases of operation.

Figure 5:
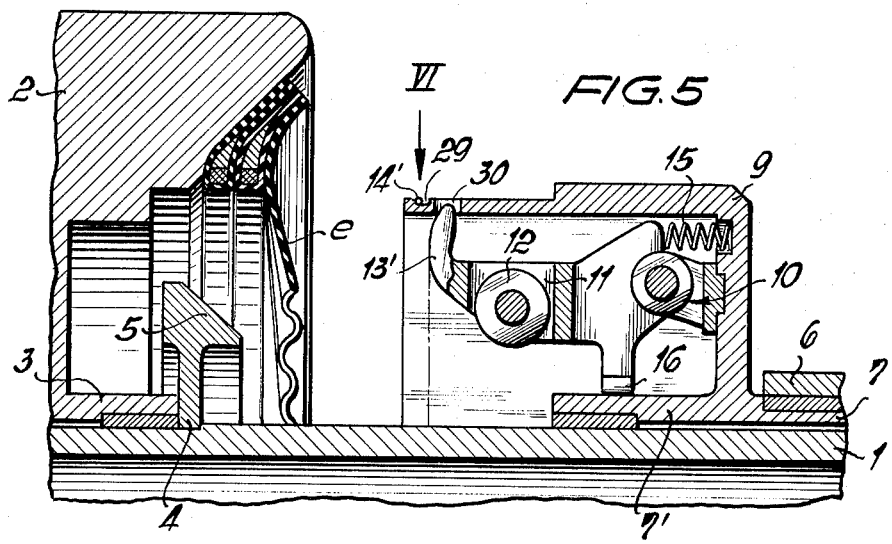

FIG. 5 illustrates a partial section through a modified machine according to the invention.

Figure 6:
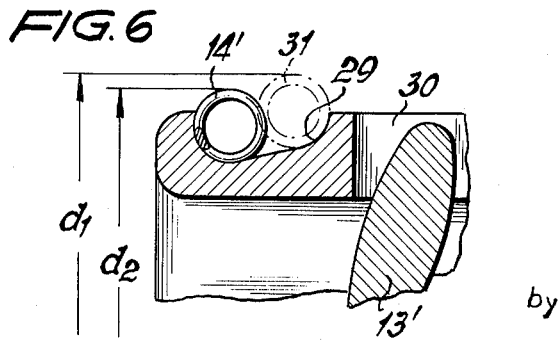

FIG. 6 illustrates in section the portion marked VI of FIG. 5 on a larger scale than that of FIG. 5.

The machine according to the present invention is characterized primarily in that the effective diameter of the ring which performs the deformation of the fabric layers or the like is variable. As a result thereof, when during a stroke of the cage a deformation of the tire fabric or the like is to be effected, the ring assumes its maximum diameter. On the other hand, a withdrawing movement of the drum will be possible without affecting the fabric placed on the drum when the ring assumes a smaller outer diameter. The thus possible variation of the ring diameter permits increasing the diameter of the ring to such an extent that the ring may be employed for lifting the bead portion of the raw tire from the tire building drum. To this end, the ring is adjacent the outer surface of the drum so guided that with an increase in the diameter of the ring, the latter may enter between the drum and the tire foot while simultaneously a deformation of the tire fabric or the like can be carried out in such a way that said fabric will, free from creases, be placed against the inner surface of the tire foot, i.e. the inner surface which faces the hollow chamber of the tire.

If desired, the means for detaching the tire foot may also be independent from the deforming ring proper and may consist for instance of segments or the like distributed over the circumference of the drum. In this connection, it is important, however, that said segments together with said ring will be able to carry out a movement back and forth with regard to the drum.

Referring now to the drawings in detail, and FIGS. 1 to 4 and 1a, 1b thereof in particular, the arrangement shown therein comprises a drum shaft 1 which is preferably hollow and at its free end has, by means of a nut 1a fixedly but detachably mounted thereon a tire building drum 2 (FIG. 1a) which is designed as high shoulder drum. While this drum 2 is adapted to be withdrawn from the hollow shaft 1 by loosening nut 1a, it is to be noted that for the first operations now to be described it is fixedly connected to shaft 1. More specifically, the hub portion 3 of the drum 2 rests against a disc 4 which is fixedly connected to the hollow shaft 1 for instance by welding. Moreover, disc 4 has at its outer circumference a tapering surface 5 which tapers away from the drum and forms with the axis thereof an angle of approximately 30 to 45°. Coaxially arranged with hollow shaft 1 is tube 6. The inner surface of tube 6 on one hand and the outer surface of hollow shaft 1 on the other hand serve for displaceably journalling a further tube 7 which is movable back and forth in the direction of the double arrow 8. Connected to said tube 7 is a cage 9 of an angle-shaped cross section. As diagrammatically illustrated in FIG. 1b, tube 7 with cage 9 is movable back and forth by a double-acting cylinder piston system generally designated 32 and comprising a cylinder 33, a piston 34 with piston rod 34a and two fluid conduits 35, 36.

Cage 9 is provided with pivot means 10 for pivotally supporting levers 11 which are distributed around the circumference of hollow shaft 1. Each of said levers 11 carries a roller 12 for cooperation with the tapering surface 5. The levers 11 are movable radially with regard to hollow shaft 1 and are tiltable about said pivot means 10. The free ends of levers 11 form fingers 13 which form approximately a right angle with regard to the respective lever 11 while pointing outwardly. All fingers 13 of levers 11 which are provided in a relatively large number are embraced by a rollable ring 14 resting in a correspondingly designed recess of fingers 13. The said ring 14 may be formed for instance by an endless annular spiral spring. Levers 11, which, when occupying their normal position, extend substantially in the direction of the hollow shaft 1, are continuously biased by pressure springs 15 resting against cage 9 which springs continuously urge levers 11 to tilt in radially inward direction so as to press foot portion 16 of the respective lever against a ring 17. Ring 17 is provided with two annular surfaces 18 and 19 of different diameters, said surfaces merging with each other through a conical surface 20. Ring 17 is movable axially into two positions in such a way that in FIG. 1 position of ring 17 foot 16 engages the annular surface 18, whereas in FIG. 4 position foot 16 engages the annular surface 19. The displacement of ring 17 is effected by axially extending push rods 21 and 22. The inner cylindrical surface of ring 17 has a circumferential groove 17' in which is arranged a spiral spring 23 extending over the inner circumference of ring 17 and depending on the position of ring 17 engages either the circumferential groove 24 (FIG. 1) or the circumferential groove 25 (FIG. 4) in tube 7. The spiral ring 23 thus serves for arresting ring 17 with regard to tube 7.

As far as the raw tire to be built up is concerned, the drawings show only the tire foot $a$ with carcass insert $b$ and the pull-resistant bead cores $c$. The drawing furthermore shows a fabric layer $d$ resting against the outer surface of the tire foot. The free marginal portion $e$ is radially spaced inwardly in the direction toward hollow shaft 1 while containing folds $d'$.

The problem underlying the present invention consists in so deforming the marginal portion $e$ which is to be looped around the tire foot or bead $a$ that it will rest against said bead $a$ in a crease-free manner and partially embrace the same.

According to FIG. 1, the levers 11 occupy a position in which foot portion 16 engages the outer cylindrical surface 18 of ring 17, and consequently the effective diameter $d_1$ of ring 14 is so adjusted that when cage 9 moves in the direction toward drum 2, ring 14 is able to set the marginal portion $e$ against the inner circumferential surface of bead $a$. The movement of cage 9 is effected by admitting a fluid under pressure through conduit 35 into cylinder 33 so that piston 34 with its piston rod 34a is moved toward the left with regard to FIG. 1b. Since cage 9 and tube 7 are directly connected to piston rod 34a, they are likewise moved toward the left. The end position of cage 9 during this operation is shown in FIG. 2. In order to prevent cage 9 from moving too far in the direction toward drum 2, cage 9 is equipped with an abutment 26 for engagement with face 2' of drum 2. After this first setting operation has been completed, the connection of drum 2 with hollow shaft 1 is made ineffective by loosening nut 1a. Upon further admission of fluid under pressure to conduit 35, cage 9 is moved further toward the left with regard to FIGS. 1 to 4, viz. into the position shown in FIG. 3. During this further movement of cage 9 hollow shaft 1 moves, relatively speaking, in a direction away from drum 2 so that the tapering surface 5 engages rollers 12 thereby tilting the respective levers 11 radially outwardly while expanding ring 14. As a result thereof, ring 14 carried by fingers 13 enters between drum 2 and tire bead $a$ as illustrated in FIG. 3 so that that portion of marginal portion $e$ which in FIG. 2 protrudes to the left from the bead $a$ will be looped around bead $a$ so as to engage the inner surface thereof. At the same time, due to the fact that the raw tire is now completed, the tire foot $a$ is detached from the drum 2. This detaching movement is important because it considerably facilitates the separation of the raw tire from drum 2.

In order to facilitate the entering of ring 14 between drum 2 and bead $a$, the drum 2 is provided with an inclined surface 27.

When roller 12 engages the tapering surface 5, push rod 22 contacts disc 4 whereby ring 17 during the further relative rightward movement of hollow shaft 1 is displaced in rightward direction with regard to the drawing so that spring 23 slips out of groove 24 and eventually engages groove 25. If now tube 7 is returned in the direction of the arrow 28 (FIG. 4) by admitting fluid under pressure to conduit 36 and venting conduit 35, rollers 12 disengage the tapering surface 5, and levers 11, due to the effect of the pressure springs 15, tilt in radially inward direction until they rest by means of their feet 16 on the surface 19 of ring 17 with the smaller diameter. Due to the fact that in this way the fingers 13 with ring 14 have been drawn inwardly so that the outer diameter $d_2$ thereof is less than the inner diameter of beads $a$, the rightward movement of cage 9 can be effected without in any way affecting the completed bead portion $a$ of the raw tire.

During the further movement of tube 7 in the direction of the arrow 28, push rod 21 eventually abuts the end surface 6 of tube 7 so that ring 17 will again be moved into the position shown in FIG. 1 with regard to ring 17 so that feet 16 again move up onto the annular surface 18 and the fingers 13 with ring 14 again occupy their greater diameter position. The device is then ready for a new working cycle.

The deformation of the marginal portion $e$ from FIG. 1 position to FIG. 2 position on one hand and the looping of the marginal portion $e$ around the bead portion $a$ and the detaching of the tire bead from drum 2 on the other hand may also be carried out by locally separate means.

Referring now to the embodiment of FIGS. 5 and 6, it will be noted that the front end of cage 9' is provided with a circumferential groove 29 having arranged therein a ring 14' forming a helical spring adapted to roll. In this connection it is important to note that the bottom of circumferential groove 29 tapers in the direction toward drum 2 so that the bottom diameter of groove 29 within the range of the free end of cage 9' is less than at the opposite end of said groove. Inasmuch as ring 14' engages the bottom of groove 29 under tension, it normally occupies the position illustrated in FIGS. 5 and 6.

Behind the circumferential groove 29 there is provided a plurality of passages 30 into which extend fingers 13', the number of said passages 30 corresponding to the number of levers 11'. It should be noted that levers 11' do not rest on a displaceable ring 17 with outer cylindrical surfaces 18 and 19 respectively as is the case with the first embodiment, but the feet 16 of said levers 11' rest on a cylindrical outer surface 7' forming an extension of tube 7.

The operation of the embodiment of FIG. 5 which is structurally somewhat simpler than that of FIG. 1 is as follows. When tube 7 moves in the direction toward drum 2, ring 14' engages the free marginal portion $e$. In view of the working pressure created thereby, ring 14' moves backwardly into the dot-dash line position 31 of FIG. 6 thereby increasing its diameter and deforming the marginal portion $e$ in the same manner as described in connection with FIG. 2. Subsequently, roller 12 engages the tapering surface 5 of member 4 as a result of which the levers 11' will be tilted radially outwardly so that the fingers 13' carry out a further deformation of the marginal portion $e$ and the detachment of bead $a$ from drum 2 in a manner similar to that described in connection with the first embodiment. When tube 7 is moved in a direction away from drum 2, the levers 11' will after rollers 12 disengage the tapering or conical surface 5 again be tilted in radial inward direction by springs 15 so that said levers 11' return to their starting position shown in FIG. 5. Furthermore, ring 14' will due to its own tension slide forwardly into the solid line position of FIG. 6 so that its diameter will again decrease from $d_1$ to $d_2$.

While the folding operation of the fabric layer around the bead portion has been shown and described in connection with one side of the tire only, viz. the right-hand side, it will be evident from the drawing that it is merely necessary to loosen nut 1a, to slide drum 2 off shaft 1, to turn the drum by 180° and fasten nut 1a again in order to fold with the same cage 9 and finger 13 the fabric layer also around the left-hand bead portion of the tire. In other words, first the fabric is placed around the bead portion on one side of the tire and subsequently around the bead portion of the other side of the tire.

It is, of course, to be understood that the present invention is, by no means, limited to the particular constructions shown in the drawings but also comprises any modifications within the scope of the appended claims.

What we claim is:

1. A machine for placing fabric plies against the radially inner circumferential bead portion of a pneumatic vehicle tire being built up, which comprises: shaft means, a tire building drum detachably mounted on said shaft means for supporting a tire being built up including the bead portion thereof, said drum having side walls and said bead portion being disposed on a side wall of the drum, and ply setting means slidably mounted on said shaft means for movement toward and away from said drum, said ply setting means including annularly arranged means of a diameter variable from a first diameter to permit introduction of said annularly arranged means into the radially inner confines of the bead portion of a tire on said drum for placing a ply against the inner circumferential surface of such bead portion to a second diameter less than said first diameter and vice versa, said annularly arranged means also including means for increasing its diameter in excess of said first diameter for causing portions of said annularly arranged means to enter in a radially outward direction between the side wall of said drum and the bead portion thereon.

2. A machine according to claim 1, in which the end face of said drum facing said ply setting means tapers inwardly.

3. A machine for placing fabric plies against the radially inner circumferential bead portion of a pneumatic vehicle tire being built up, which comprises: shaft means, a tire building drum detachably mounted on said shaft means for supporting a tire being built up including the bead portion thereof, said drum having side walls and said bead portion being disposed on a side wall of the drum, and ply setting means slidably mounted on said shaft means for movement toward and away from said drum, said ply setting means including annularly arranged means of variable diameter to permit introduction of said annularly arranged means into the radially inner confines of the bead portion of a tire on said drum and withdrawal therefrom without contacting such bead portion, said ply setting means also including means movable selectively radially outwardly beyond the inner confines of the bead portion of a tire on said drum and between said bead portion and the adjacent side wall of the drum.

4. A machine for placing fabric plies against the radially inner circumferential bead portion of a pneumatic vehicle tire being built up, which comprises: shaft means, a tire building drum detachably mounted on said shaft means for supporting a tire being built up including the bead portion thereof, said drum having side walls and said bead portion being disposed on a side wall of the drum, ply setting means slidably mounted on said shaft means for movement toward and away from said drum, said ply setting means including annularly arranged means of variable diameter to permit introduction of said annularly arranged means into the radially inner confines of the bead portion of a tire on said drum and withdrawal therefrom without contacting such bead portion, and finger means substantially radially adjustable with regard to said annularly arranged means and supporting the same, said finger means being operable for moving said annularly arranged means radially outwardly between the bead portion and the adjacent side wall of the drum.

5. In a machine for placing fabric plies against the radially inner circumferential bead portion of a pneumatic vehicle tire being built up, which comprises: shaft means, a tire building drum detachably mounted on said shaft means for supporting a tire being built up including the bead portions thereof, said drum having side walls and said bead portion being disposed on a side wall of the drum, and ply setting means slidably mounted on said shaft means for movement toward and away from said drum, said ply setting means including annularly arranged means of variable diameter and also including means radially adjustable with regard to and beyond the outer diameter of said annularly arranged means and independent thereof for selective movement between a side wall of said drum and the bead portion of a tire on said side wall of said drum.

6. An arrangement according to claim 3, which includes cam means mounted on said shaft means and operable in response to a certain movement of said ply setting means with regard to said drum to bring about movement of said radially outwardly movable means in a radial outward direction.

7. A machine for placing fabric plies against the radially inner circumferential bead portion of a pneumatic vehicle tire being built up, which comprises: shaft means, a tire building drum detachably mounted on said shaft means for supporting a tire being built up including the bead portions thereof, said drum having side walls and said bead portion being disposed on a side wall of the drum, ply setting means slidably supported by said shaft means for movement toward and away from said drum, said ply setting means including annularly arranged means of variable diameter, said ply setting means also including lever means having extensions movable in a first direction namely radially outwardly with regard to said annularly arranged means beyond the maximum diameter of said annularly arranged means, said lever means being operable independently of said annularly arranged means, cam means operable at a predetermined distance between said drum and said lever means to actuate said lever means for moving said extensions radially outwardly with regard to said annularly arranged means, and spring means continuously biasing said lever means in a direction opposite to said first direction, said cam means being positioned relative to said drum to effect outward movement of said extensions along the side wall of the drum and between the side wall of the drum and a bead portion thereon.

8. An arrangement according to claim 7, which includes abutment means for limiting the movement of said lever means in a direction opposite to said first direction.

9. A machine for placing fabric plies against the radially inner circumferential bead portion of a pneumatic vehicle tire being built up, which comprises: shaft means, a tire building drum detachably mounted on said shaft means for supporting a tire being built up including the bead portion thereof, said drum having side walls and said bead portion being disposed on a side wall of the drum, ply setting means slidably mounted on said shaft means for moving toward and away from said drum, said ply setting means including annularly arranged means of variable diameter, said ply setting means also including lever means supporting said annularly arranged means, means supported by said shaft means for controlling said lever means in response to movement of said ply setting means along said shaft means and operable to cause said lever means to move said annularly arranged means radially outwardly between a side wall of the drum and a bead portion thereon, and abutment means movable relative to said lever means and having two abutment surfaces of different diameter for successively engaging said lever means in response to a relative movement between said ply setting means and said shaft means.

10. A machine for placing fabric plies against the radially inner circumferential bead portion of a pneumatic vehicle tire being built up, which comprises: shaft means, a tire building drum detachably mounted on said shaft means for supporting a tire being built up including the bead portions thereof, said drum having side walls and said bead portion being disposed on a side wall of the drum, ply setting means slidably supported by said shaft means for moving toward and away from said drum, said ply setting means including annularly arranged means of variable diameter and also including lever means supporting said annularly arranged means, means supported by said shaft means for controlling said lever means in response to movement of said ply setting means along said shaft means and operable to cause said lever means to move said annularly arranged means radially outwardly between a side wall of the drum and a bead portion thereon, ring means supported by said ply setting means and having two abutment surfaces succeeding each other in axial direction of said ring means and being of different diameter for successively engaging said lever means in response to a relative movement between said ply setting means and said shaft means, and abutment means respectively associated with the end faces of said ring means for bringing about a relative axial movement of said ring means with regard to said ply setting means thereby making effective one or the other of said abutment surfaces.

11. A machine according to claim 10, which includes arresting means for arresting said ring means in the respective position in which either one of said abutment surfaces engages said lever means.

12. A machine for placing fabric plies against the radially inner circumferential bead portion of a pneumatic vehicle tire being built up, which comprises: shaft means, a tire building drum detachably mounted on said shaft means for supporting a tire being built up including the bead portions thereof, said drum having side walls and said bead portion being disposed on a side wall of the drum, ply setting means slidably supported by said shaft means for movement toward and away from said drum, said ply setting means including annularly arranged means of variable diameter and also including lever means provided with finger-shaped extensions supporting said annularly arranged means and forming an angle with the remainder of said lever means for actuating said annularly arranged means, cam means operable at a predetermined distance between said drum and said lever means to bring about actuation of said lever means for moving said extensions radially outwardly with regard to said annularly arranged means to thrust said annularly arranged means radially outwardly between a side wall of the drum and a bead portion thereon, and spring means continuously biasing said lever means in a direction radially inwardly with regard to said annularly arranged means.

13. A machine for placing fabric plies against the radially inner circumferential bead portion of a pneumatic vehicle tire being built up, which comprises; shaft means, a tire building drum detachably mounted on said shaft means for supporting a tire being built up including the bead portions thereof, said drum having side walls and said bead portion being disposed on a side wall of the drum, ply setting means slidably supported by said shaft means for movement toward and away from said drum, said ply setting means including a member having a cylindrical wall substantially coaxial with said shaft means and provided with an annular groove on the outer periphery of said cylindrical wall, and annularly arranged yieldable and elastic means of variable diameter mounted in said annular groove, the bottom of said annular groove tapering in the direction toward said drum so that that end of said groove which is adjacent said drum has a diameter less than the diameter of that end of said grove which is remote from said drum, said annularly arranged means when being at that end of said groove which is remote from said drum having a diameter to permit introduction of said annularly arranged means into the inner confines of a bead portion of a tire on said drum for placing a ply against the inner circumferential surface of said bead portion, said ply setting means also including means movable selectively radially outwardly beyond the inner confines of the bead portion of a tire on said drum and between said bead portion and the adjacent side wall of the drum.

References Cited by the Examiner
UNITED STATES PATENTS

| | | | |
|---|---|---|---|
| 2,503,815 | 4/1950 | Frohlich | 156—398 |
| 2,567,064 | 9/1951 | Frazier | 156—132 |
| 2,605,198 | 7/1952 | Haase | 156—132 |
| 2,715,931 | 8/1955 | Frazier | 156—132 |
| 2,981,310 | 4/1961 | Frohlich et al. | 156—400 |

EARL M. BERGERT, *Primary Examiner.*

H. ANSHER, *Examiner.*